(No Model.)

W. T. MESSINGER.
PIPE COUPLING AND VALVE.

No. 444,451. Patented Jan. 13, 1891.

Witnesses,
Jas. F. Maloney
Chas. E. Hall

Inventor,
W. T. Messinger,
by Jos. P. Livermore
Att'y.

UNITED STATES PATENT OFFICE.

WILLIAM T. MESSINGER, OF BOSTON, MASSACHUSETTS.

PIPE-COUPLING AND VALVE.

SPECIFICATION forming part of Letters Patent No. 444,451, dated January 13, 1891.

Application filed May 31, 1888. Serial No. 275,646. (No model.)

*To all whom it may concern:*

Be it known that I, WILLIAM T. MESSINGER, of Boston, county of Suffolk, and State of Massachusetts, have invented an Improvement in Combined Pipe-Coupling and Valve, of which the following description, in connection with the accompanying drawings, is a specification, like letters on the drawings representing like parts.

My invention is embodied in a pipe-coupling or connector containing a check-valve and so constructed that the valve may be removed by unscrewing the coupling-nut without separating the ends of the pipes that are joined by the coupling.

The invention consists in the combination, with coupling-pieces adapted to be connected with the ends of the pipes that are to be coupled together, and one of said coupling-pieces being provided with a valve-seat, of a removable chamber introduced between the said coupling-pieces and inclosed within the coupling-nut, and a valve co-operating with the seat on the coupling-piece and operating to permit fluid to flow through the coupling in one direction, but not in the other.

The invention further consists in details of construction, that will be hereinafter pointed out.

Figure 1:
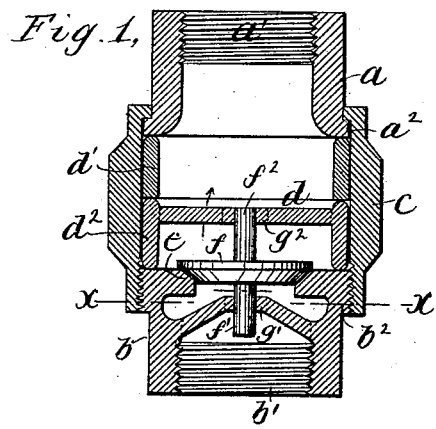
Figure 2:
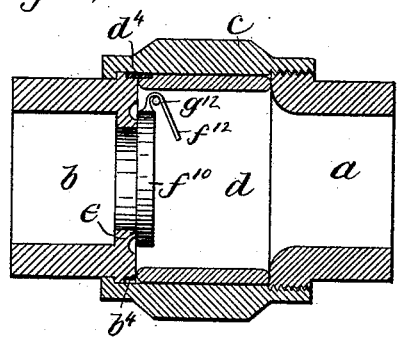
Figure 3:
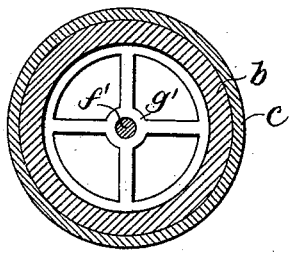
Figure 4:
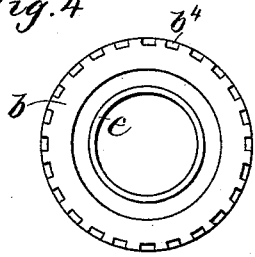

Figure 1 is a longitudinal section of a combined coupling and valve embodying this invention; Fig. 2, a longitudinal section showing a modified construction of the combined valve and coupling; Fig. 3, a transverse section on line $x\ x$, Fig. 1; and Fig. 4, an end view of the coupling-piece of Fig. 2.

The two coupling-pieces $a\ b$ are adapted to be connected with the ends of the pipe to be coupled together in the usual manner, as by the external screw-threads $a'\ b'$. One of said coupling-pieces is provided with the usual flange or shoulder $a^2$ and the other with the externally-threaded portion $b^2$, which co-operate with the coupling-nut $c$, which instead of drawing the two coupling-pieces $a\ b$ against one another or against an interposed washer or packing-ring receives within it an annular chamber $d$, which is interposed between the coupling-pieces $a\ b$, so that when the coupling-nut is turned up tight the coupling-pieces are pressed against the ends of the said chamber, making a tight joint therewith. The meeting faces at the joints are made one plane and the other rounded, so that a fluid-tight connection is afforded by pressing them together. This construction of the coupling-pieces, nut, and coupling-chamber is not claimed except in combination with other devices and features of construction that will be now specified.

One of the coupling-pieces, as $b$, is provided at its face that projects toward the interior of the coupling with a valve-seat $e$, and the coupling contains a valve $f$, that co-operates with the said seat. As shown in Fig. 1, the valve $f$ is a puppet-valve having a rectilinear movement toward and from its seat, and the coupling-piece $b$ is provided with a guide $g$ for the stem $f'$ of said valve, the said guide $g$ being supported on arms, as shown in Fig. 3, which permit the passage of fluid through the coupling-piece. In order to further guide and to limit the movement of the valve $f$, the chamber $d$ is provided with a similar guide $g^2$, co-operating with a portion $f^2$ of the valve-stem, said guide also being supported on arms that permit the flow of fluid between them, like the guide $g$ in the coupling-pieces. By the employment of the chamber $d$ and the long coupling-nut $c$ inclosing the same a space is afforded between the adjacent ends of the coupling-pieces $a\ b$ when coupled together, which space is sufficient for the removal of the valve without separation of the pieces when required. When the valve is guided partly in the coupling-piece and partly in the chamber, as shown in Fig. 1, it would interfere with the lateral movement of the chamber $d$ if that were made in a single piece, or in two pieces having an overlapped joint of any kind, and in order to provide for the removal of the chamber $d$ and valve the said chamber is, as shown in this instance, made in two parts $d'\ d^2$, one of the meeting faces of which is made plane, so that when the coupling-nut $c$ is slipped back and the pressure on the ends of the chamber relieved the said piece $d'$ may be slipped out laterally from between the coupling-piece $a$ and the portion $d^2$ of the chamber, which may then be moved endwise, so as to disengage the valve-stem, and then removed laterally, after which the valve itself may be removed and any operation that may be required performed either upon the valve or its seat. The coupling-piece $b$ may itself be readily removed from the pipe after the chamber $d$ has been withdrawn from between the coupling-pieces.

Fig. 2 illustrates a modified construction in which a flap-valve $f^{10}$ is employed, being provided with a supporting-hook or hinge-piece $f^{12}$, that engages a pivot pin or projection $g^{12}$ in the chamber $d$, which contains the valve wholly within it, and may be made in a single piece, as shown. When a valve of this kind is used in a horizontal position, or, in fact, in any position other than the vertical, it is desirable that the hinge $g^{12}$ should be at the highest part, so that the valve will tend to seat by the action of gravity.

In order to insure that the chamber $d$ shall be properly placed to have the hinge at the highest part and shall not be moved from this position in turning up the coupling-nut, the coupling-piece $b$ may be provided with a number of recesses or notches $b^4$ and the chamber $d$ with a projection $d^4$, which enters one of said recesses and prevents the chamber $d$ from turning when the coupling-nut is turned up, the said projection being placed in a recess when the chamber $d$ is in the position that brings the valve-hinge at the uppermost point. The hinge hook or projection $f^{12}$ is extended, as shown, so that when the chamber $d$ is in place between the coupling-pieces the valve cannot be disengaged from its pivot; but when the chamber is removed from between the coupling-pieces the valve may be unhooked from its pivot and taken from the chamber.

I claim—

1. The combination of a pair of coupling-pieces, one provided with a valve-seat, with a coupling-nut and a chamber engaged at its ends by the said coupling-pieces and inclosed in said nut, being laterally removable from between said coupling-pieces without separating them, and a valve co-operating with the seat on the coupling-piece, substantially as described.

2. The combination of a pair of coupling-pieces and a co-operating coupling-nut with an independent chamber inclosed within the said coupling-nut and engaged at its ends by said coupling-pieces, being laterally removable from between said coupling-pieces without separating them, one of said coupling-pieces being provided with a valve-seat and valve-stem guide, and a valve co-operating with said seat and having a stem that works in said guide, substantially as described.

3. The combination of two coupling-pieces and a co-operating coupling-nut with a chamber inclosed within the said nut and interposed between said coupling-pieces, the said chamber being made in two parts, one laterally movable from between the other and the adjacent coupling-piece, and one of said coupling-pieces being provided with a valve-seat and valve-stem guide, and one portion of said chamber being provided with a valve-stem guide, and a valve co-operating with said seat, having a stem co-operating with said guides, substantially as described.

In testimony whereof I have signed my name to this specification in the presence of two subscribing witnesses.

WM. T. MESSINGER.

Witnesses:
Jos. P. Livermore,
M. E. Hill.